2 Sheets--Sheet 1.

F. KOCH & R. BRASS.

Sewing-Machines.

No. 6,003.

Reissued Aug. 11, 1874.

WITNESSES:

Jno. L. Ewin.

Walter Allen.

INVENTOR:

Friedrich Koch & Robert Brass.

By Wright Bros. Attorneys.

THE GRAPHIC CO. PHOTO-LITH. 39 & 41 PARK PLACE, N.Y.

2 Sheets--Sheet 2.

F. KOCH & R. BRASS.

Sewing-Machines.

No. 6,003.

Reissued Aug. 11, 1874.

WITNESSES:

Jas. L. Ewin.

Walter Allen.

INVENTOR:

Friedrich Koch & Robert Brass

By Knight Bros Attorneys.

THE GRAPHIC CO. PHOTO-LITH. 39 & 41 PARK PLACE, N.Y.

UNITED STATES PATENT OFFICE.

FRIEDRICH KOCH AND ROBERT BRASS, OF BROOKLYN, NEW YORK, ASSIGNORS TO JOHN BOYLE, OF NEW YORK CITY.

IMPROVEMENT IN SEWING-MACHINES.

Specification forming part of Letters Patent No. 138,898, dated May 13, 1873; reissue No. 6,003, dated August 11, 1874; application filed July 3, 1874.

*To all whom it may concern:*

Be it known that we, FRIEDRICH KOCH and ROBERT BRASS, both of the city of Brooklyn and county of Kings, in the State of New York, have jointly invented an Improved Sewing-Machine, of which the following is a specification:

This invention relates to sewing-machines for work on heavy fabrics. The primary object of the invention is to combine, in a machine of this class, the advantages of a lock-stitch and a positive awl-feed. Another object of the invention is the production of a simple and efficient device for locking the presser-foot, to resist the thrust of an awl, which pierces the fabric from beneath.

The first part of the invention consists in the combination of a piercing and feeding awl, working from beneath the fabric, a thread-carrying needle operating from above the fabric, a presser-foot, and a shuttle, with a device for locking the presser-foot in position while the awl is piercing the fabric. The second part of the invention consists in the combination of a strap embracing the presser-stem and a clamping-lever operating therein, to intermittently lock the presser.

Figure 1:
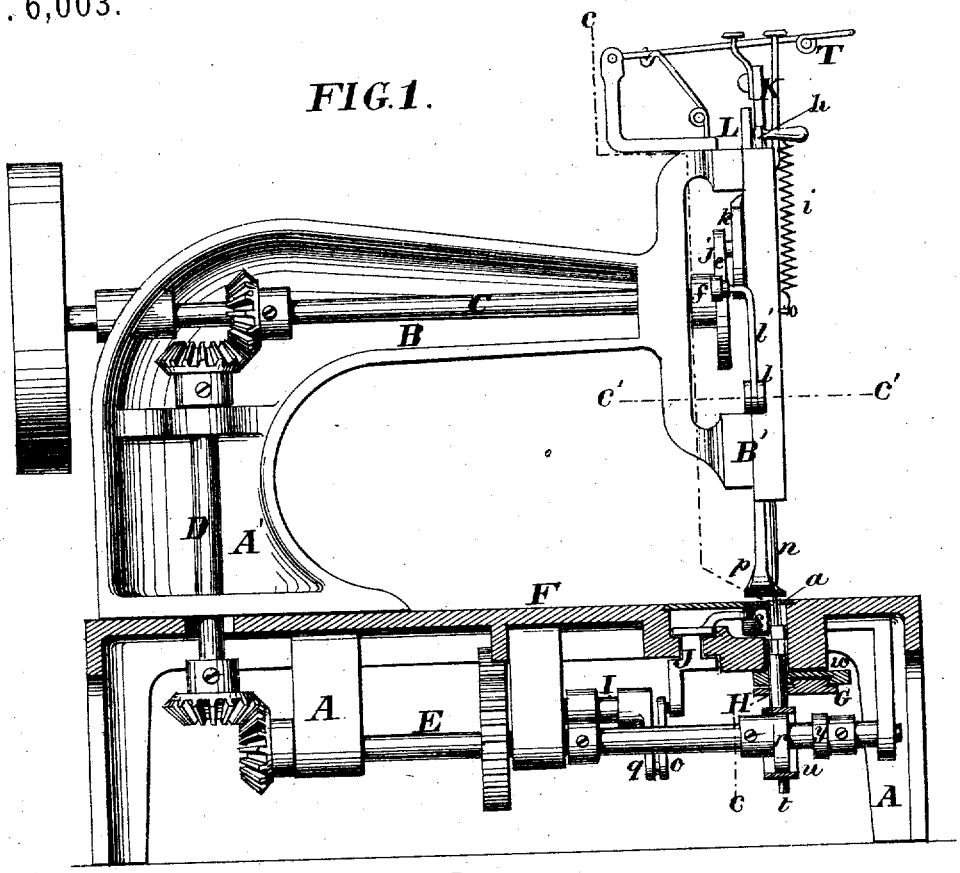
Figure 2:
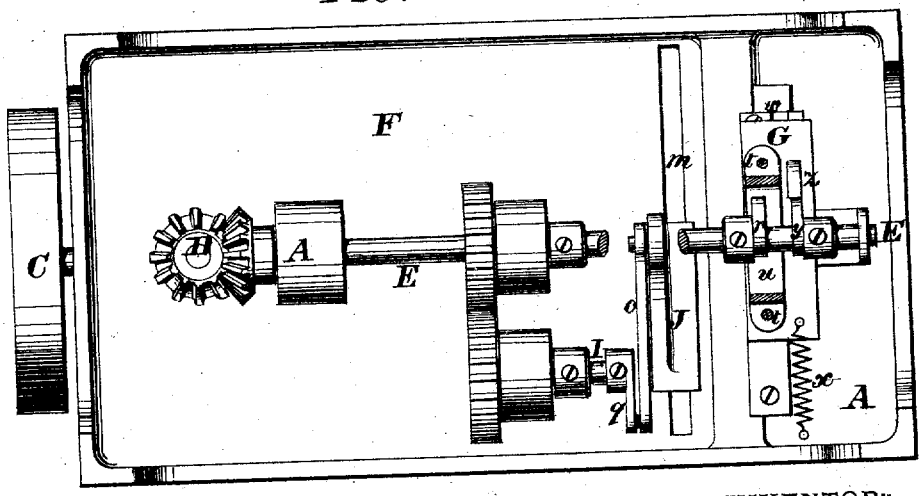
Figure 3:
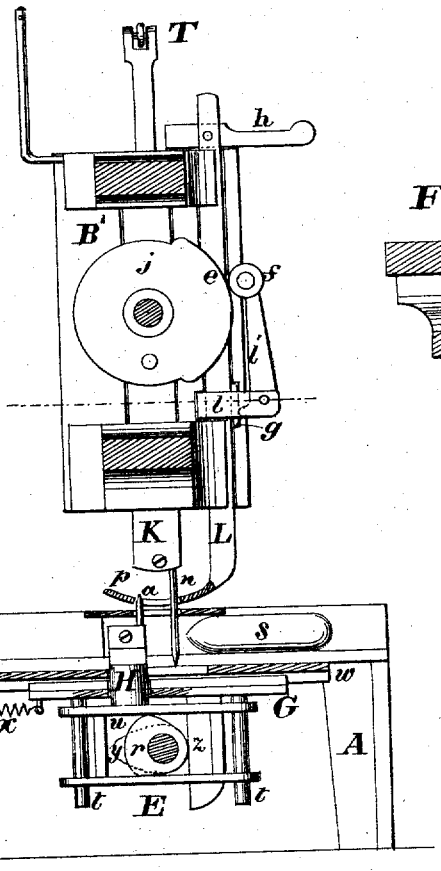
Figure 4:
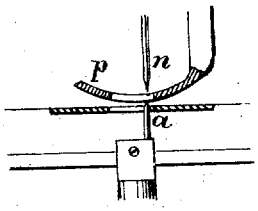
Figure 5:
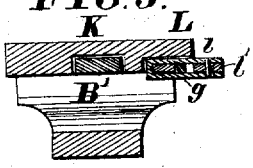

Figure 1 is a side view of a sewing-machine illustrating this invention, the same being represented partly in vertical section on a central line. Fig. 2 is a bottom view of the same, portions being broken away to expose the parts beneath. Fig. 3 is a vertical transverse section of the same in the broken plane indicated by the line *c*, Fig. 1, the parts being represented as they appear when the awl has just pierced the fabric. Fig. 4 is a partial section in the same plane, representing the parts as they appear when the awl is being retracted after having fed the fabric. Fig. 5 is a horizontal section of the head on the line *c'*, Fig. 1.

Referring to the drawing, A A A' represent the base-frame and standard, and B the arm, of a sewing-machine. B' represents the head of the same. C represents the main shaft; D, a connecting-shaft, and E the feed-shaft, which are united by bevel-gears, the feed-shaft being arranged beneath the horizontal face-plate or table F. G represents a feed-slide, which is termed the awl-carriage; *z*, a rigid arm depending therefrom; *y*, an oval cam on the feed-shaft E, for projecting the awl-carriage; and *x*, a spring for retracting the same. *w* represents a horizontal rail, with a dovetailed groove to support and guide the awl-carriage. H represents a vertical slide, termed the awl-stock, and which works in a guide-hole in the awl-carriage G, and in slots formed in the guide-rail *w* and in the frame for its reception. *a* represents the awl. *u* represents a yoke, formed at the lower end of the awl-stock; and *t t*, vertical rods depending from the awl-carriage, and occupying perforated lugs on the sides of the yoke *u*, to guide the awl-stock. *r* represents a three-sided cam on the feed-shaft E, within the yoke *u*, to project and depress the awl-stock and awl. I represents a short shaft, journaled in a hanger parallel to the feed-shaft E, and connected at its rear end to the latter by spur-gearing. *q* represents a crank on the front end of the shaft; *o*, a connecting-link, and J the shuttle-slide, which is reciprocated by these means. *s* represents the shuttle, which, in the illustration, works in a horizontal race of ordinary construction. *m* represents the guideway in which the shuttle-slide works. The shaft I carries the shuttle-driving crank *q* without interfering with the feed-shaft E, which latter serves, mainly, to overcome the resistance of the fabric in feeding, being not weakened by the shuttle-connection. K represents the needle-slide, and *n* the needle; *k*, a yoke on the back of the needle-slide, and *j* a crank-disk on the front end of the main shaft C, with its wrist within the yoke *k*, to reciprocate the needle-bar and needle. L represents the presser-slide; *i*, a spring for depressing the same; *h*, the cam-lever for elevating the presser-slide, and *p* the presser-foot. *l* represents a metallic strap or loop, supported within a recess in the face-plate of the head B', in the path of the presser-slide, to embrace the latter, as most clearly illustrated in Fig. 5. *l'* represents an elbow-lever, pivoted in the open outer end of the strap *l*, to constitute therewith a lock for holding the presser while the awl is piercing the fabric. *g* represents an interposed bearing-plate, and *f* represents a roller on the laterally-bent upper end of the lever. *e* represents a cam projection on the periphery of the crank-disk *j*, to engage with the roller *f*, for the purpose of operating the lock *l l'*. T represents a take-up, which forms no part of the present invention, and which, with other details of the machine not herein specified, may be of any approved construction.

The peculiar operation of this machine is as follows, it being understood that the needle *n* and shuttle *s* are each supplied with thread, and that proper motions are transmitted to the several moving parts from the rotary main shaft C, which may be driven by any approved means. The work having been adjusted beneath the presser-foot *p*, with the needle *n* in elevated position, the machine is started. The needle *n* first descends, and the awl-carriage is retracted by its spring *x*. The cam projection *e* then comes in contact with the roller *f* and operates the lock *l l'*, which holds the presser against rising by clamping its shank within the strap *l* between the back of the latter and the bearing-plate *g*. Now, before the needle rises, the awl *a*, under the action of the cam *r*, pierces the fabric, as illustrated in Fig. 3. The needle then, or in part during the piercing movement of the awl, rises, and when it has cleared the work, the awl feeds the work, under the action of the cam *y*, the lock *l l'* having been relaxed by the cam projection *e* passing out of contact with the roller *f*. The awl is now retracted in line with the needle by the second action of the cam *r*, as illustrated in Fig. 4, and the needle follows the awl through the perforation formed by the latter, and carries the burr formed by the awl back into or through the fabric, so as to leave the face smooth. The shuttle *s* then passes through the needle-loop, and a lock-stitch is thus formed. The presser is then locked again; the awl pierces the fabric; the needle is retracted; the presser is unlocked; the awl feeds and retires; the needle again descends, and the shuttle forms therewith another stitch, and thus the operation proceeds.

The following is claimed as new:

1. The combination, in a sewing-machine, of an awl for piercing and feeding the work, an eye-pointed needle, a shuttle, a presser-foot, and a lock, substantially as described, for holding the presser-foot while the awl is piercing the work, as herein set forth.

2. The lever and strap-lock *l l'*, in combination with and for intermittingly holding the presser, as set forth.

FRIEDRICH KOCH.
ROBERT BRASS.

Witnesses:
CHARLES WIRTHS,
FUSTUS UDERITZ.